(12) United States Patent
Brantley et al.

(10) Patent No.: US 11,107,163 B2
(45) Date of Patent: Aug. 31, 2021

(54) OPERATIONAL DATA CORRESPONDING TO A PRODUCT MODEL

(71) Applicant: Guidewire Software, Inc., Foster City, CA (US)

(72) Inventors: Benjamin David Brantley, San Carlos, CA (US); Diana Elizabeth Jaffe, Mountain View, CA (US)

(73) Assignee: Guidewire Software, Inc., San Mateo, CA (US)

( * ) Notice: Subject to any disclaimer, the term of this patent is extended or adjusted under 35 U.S.C. 154(b) by 15 days.

(21) Appl. No.: 16/425,505

(22) Filed: May 29, 2019

(65) Prior Publication Data

US 2019/0279308 A1   Sep. 12, 2019

Related U.S. Application Data

(63) Continuation of application No. 14/546,952, filed on Nov. 18, 2014, now Pat. No. 10,366,456.

(60) Provisional application No. 62/043,655, filed on Aug. 29, 2014.

(51) Int. Cl.
 *G06Q 40/08* (2012.01)
(52) U.S. Cl.
 CPC .................... *G06Q 40/08* (2013.01)
(58) Field of Classification Search
 CPC ........ G06Q 10/00; G06Q 20/00; G06Q 30/00; G06Q 40/00; G06Q 40/08
 USPC ...................................... 705/3–44
 See application file for complete search history.

(56) References Cited

U.S. PATENT DOCUMENTS

| 792,656 | A | * | 6/1905 | Heberling | ............ | F16H 57/0431 |
|---|---|---|---|---|---|---|
| | | | | | | 74/468 |
| 7,765,118 | B1 | | 7/2010 | Bohanek | | |
| 8,176,145 | B1 | | 5/2012 | Stender | | |
| 8,433,588 | B2 | * | 4/2013 | Willis | .................... | G06Q 40/08 |
| | | | | | | 705/4 |
| 8,452,678 | B2 | | 5/2013 | Feldman | | |
| 8,521,567 | B2 | * | 8/2013 | Varanasi | ................ | G06Q 10/10 |
| | | | | | | 705/4 |
| 8,560,353 | B2 | | 10/2013 | Smith | | |
| 8,731,978 | B2 | | 5/2014 | Tracy | | |
| 8,775,221 | B2 | | 7/2014 | Feldman | | |

(Continued)

OTHER PUBLICATIONS

Rose, Stuart, "Adopting an insurance data model for a single version of the truth", Insurance & Technology-Online; Monmouth Junction, Nov. 6, (Year: 2011).*

(Continued)

*Primary Examiner* — Frantzy Poinvil
(74) *Attorney, Agent, or Firm* — Van Pelt, Yi & James LLP

(57) ABSTRACT

A system for presenting operational data is disclosed. The system includes a storage element to store a plurality of insurance policies and a product designer module to: maintain an insurance product model that specifies possible configurations of insurance policy products associated with the plurality of insurance policies; obtain operational data pertaining to a set of existing insurance transactional data associated with the insurance policies; and present to be displayed: at least a portion of the insurance product model comprising a set of insurance product model elements and at least some of the operational data corresponding to the set of insurance product model elements.

25 Claims, 15 Drawing Sheets

(56) References Cited

U.S. PATENT DOCUMENTS

| | | | |
|---|---|---|---|
| 8,799,125 B2* | 8/2014 | Schumann, Jr. | G06Q 40/08 705/35 |
| 9,830,661 B2* | 11/2017 | Woods | G06Q 40/08 |
| 9,858,621 B1* | 1/2018 | Konrardy | G08G 1/096725 |
| 10,832,341 B1* | 11/2020 | Mullen | G06Q 40/08 |
| 2002/0002475 A1 | 1/2002 | Freedman | |
| 2010/0223078 A1* | 9/2010 | Willis | G06Q 40/08 705/4 |
| 2011/0004493 A1* | 1/2011 | Bradshaw | G06Q 10/02 705/4 |
| 2011/0153369 A1 | 6/2011 | Feldman | |
| 2012/0284058 A1* | 11/2012 | Varanasi | G06Q 40/08 705/4 |
| 2013/0226624 A1 | 8/2013 | Blessman | |
| 2013/0253961 A1 | 9/2013 | Feldman | |
| 2013/0317860 A1* | 11/2013 | Schumann, Jr. | G06Q 40/08 705/4 |
| 2013/0325599 A1* | 12/2013 | Yeri | G06Q 40/02 705/14.49 |
| 2014/0039940 A1 | 2/2014 | Smith | |
| 2014/0324484 A1 | 10/2014 | Feldman | |
| 2015/0073834 A1* | 3/2015 | Gurenko | G06Q 10/10 705/4 |
| 2016/0048924 A1* | 2/2016 | Arnatt | G06Q 40/08 705/4 |
| 2016/0125422 A1* | 5/2016 | Blanco | G06Q 40/08 705/4 |

OTHER PUBLICATIONS

The Hartford Financial Services Group, Inc., Investor Day-Final, Fair Disclosure Wire, Linthicum, Proquest Id: 465910261, Mar. 28, 2005.*

* cited by examiner

Guidewire Product Designer

Product Model

▷ Audit Schedules
▽ Policy Lines
  ▷ Businessowners Line [BOPLine]
  ▷ Commercial Auto Line [BusinessAutoLine]
  ▷ Commercial Property Line [CPLine]
  ▷ General Liability Line [GLLine]
  ▷ Inland Marine Line [IMLine]
  ▷ Personal Auto Line [PersonalAutoLine]
  ▷ Worker's Comp Line [WorkersCompLine]
▷ Products
▷ Question Sets
▷ System Tables Policy Lines Revert   Add   Delete

| Sequence ▲ | Name |
|---|---|
| 1 | Personal Auto Line |
| 2 | Workers' Comp Line |
| 3 | Businessowners Line |
| 4 | Commercial Auto Line |
| 5 | General Liability Line |
| 6 | Commercial Property Line |
| 7 | Inland Marine Line |

Guidewire Product Designer      Change List Name ▼    👤 Diana ⚙ ❔ 🗔

Product Model 〉 Policy Lines 〉 Personal Auto 〉 Coverages

- Audit Schedules
- Policy Lines
  - ▲ Businessowners Line [BO...
  - ▲ Commercial Auto Line [Bu...
  - ▲ Commercial Property Line...
  - ▲ General Liability Line [GL...
  - ▲ Inland Marine Line [IMLine...
  - ▼ Personal Auto [PersonalA...
    - ▲ Categories
    - ● Conditions
    - ▼ Coverages
      - ▲ Collision [PACollisionC...
      - ▲ Collision - Limited Co...
      - ▲ Comprehensive [PAC...
      - ▪ Death & Disability Ben...
      - ▲ Electronic Equipment [...
      - ▲ Liability - Bodily Injury...
      - ▲ Medical Payments [PA...
      - ▲ Mexico Coverage - Lin...
      - ▲ PIP - Arkansas [PAPIP...
      - ▲ PIP - Delaware [PAPIP...
      - ▲ PIP - District of Colum...

Death & Disability Benefit [PADeathDisability Cov]      Delete

Revert   Validate

Go to
Terms
Reinsurance
Availability
Offerings

Name*   [Death & Disability Benefit] 🌐
Description   [Death & Disability Benefit] 🌐
Covered Object PersonalAutoLine
Existence*   [Electable ⌄]
Category*   [Personal Injury ⌄]

▲ Advanced

300

302

Options

| | 1 Year ▽ | All US ▽ | | 1 Year ▽ | California ▽ |
|---|---|---|---|---|---|
| | | Bound Policies | | | Bound Policies |
| 1000 | | 5004 | | | 1065 |
| 2000 | | 72,312 | | | 20,300 |
| 5000 | | 14,400 | | | 7,234 |

FIG. 8B

Options

| | 1 Year ▽ | All US ▽ | | 1 Year ▽ | California ▽ | |
|---|---|---|---|---|---|---|
| | Bound Policies | | | Bound Policies | Comparison | |
| 1000 | 5004 | | | 1065 | 21% | → (red) |
| 2000 | 72,312 | | | 20,300 | 28% | → (red) |
| 5000 | 14,400 | | | 7,234 | 50% | → (green) |
| Total Bound Policies: 91716 | | | | 28599 | 31% | |

FIG. 8C

Options

| Data | 1 Year ▽ All US ▽ | | 1 Year ▽ California ▽ | |
|---|---|---|---|---|
| | Bound Policies | | Bound Policies | Comparison |
| 1000 | 5004 | | 1065 | 21% → (red) |
| 2000 | 72,312 | | 20,300 | 28% → (red) |
| 5000 | 14,400 | | 7,234 | 50% → (green) |
| Total Bound Policies: 91716 | | | 28599 | 31% |

Product Model Change    A new option of $10000 was added for collision Deductibles in california for 01/01/2016-07/01/2016

Note from user AApplegate    Found that CA drivers prefer higher deductibles. Piloting our very high-deductible plan in CA based on this information

FIG. 8D

OPERATIONAL DATA CORRESPONDING TO A PRODUCT MODEL

CROSS REFERENCE TO OTHER APPLICATIONS

This application is a continuation of co-pending U.S. patent application Ser. No. 14/546,952, now U.S. Pat. No. 10,366,456, entitled OPERATIONAL DATA CORRESPONDING TO A PRODUCT MODEL filed Nov. 18, 2014 which is incorporated herein by reference for all purposes, which claims priority to U.S. Provisional Application No. 62/043,655, entitled OPERATIONAL DATA CORRESPONDING TO A PRODUCT MODEL filed Aug. 29, 2014 which is incorporated herein by reference for all purposes.

BACKGROUND OF THE INVENTION

Insurance software is required to manage and store large amounts of insurance related data for a vast array of insurance products and options that may be desired by various customers, e.g., insurance carriers. Some insurance software uses an insurance product model to organize insurance related data. Users may use specialized software to view, create, and make changes to an insurance product model. Such software typically has limited intelligence, particularly in terms of providing useful information to help the user make decisions on how to edit the product model.

BRIEF DESCRIPTION OF THE DRAWINGS

Various embodiments of the invention are disclosed in the following detailed description and the accompanying drawings.

FIG. 3A is a diagram illustrating an embodiment of an interface for editing an insurance product model.

FIG. 3B is a diagram illustrating an embodiment of an interface for editing an insurance product model showing the navigation tree more fully expanded.

FIG. 8B is a diagram illustrating an embodiment of a product designer user interface for displaying multiple views at one time.

FIG. 8C is a diagram illustrating an embodiment of a product designer user interface that includes visual feedback.

FIG. 8D is a diagram illustrating an embodiment of a product designer user interface that includes a user note.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
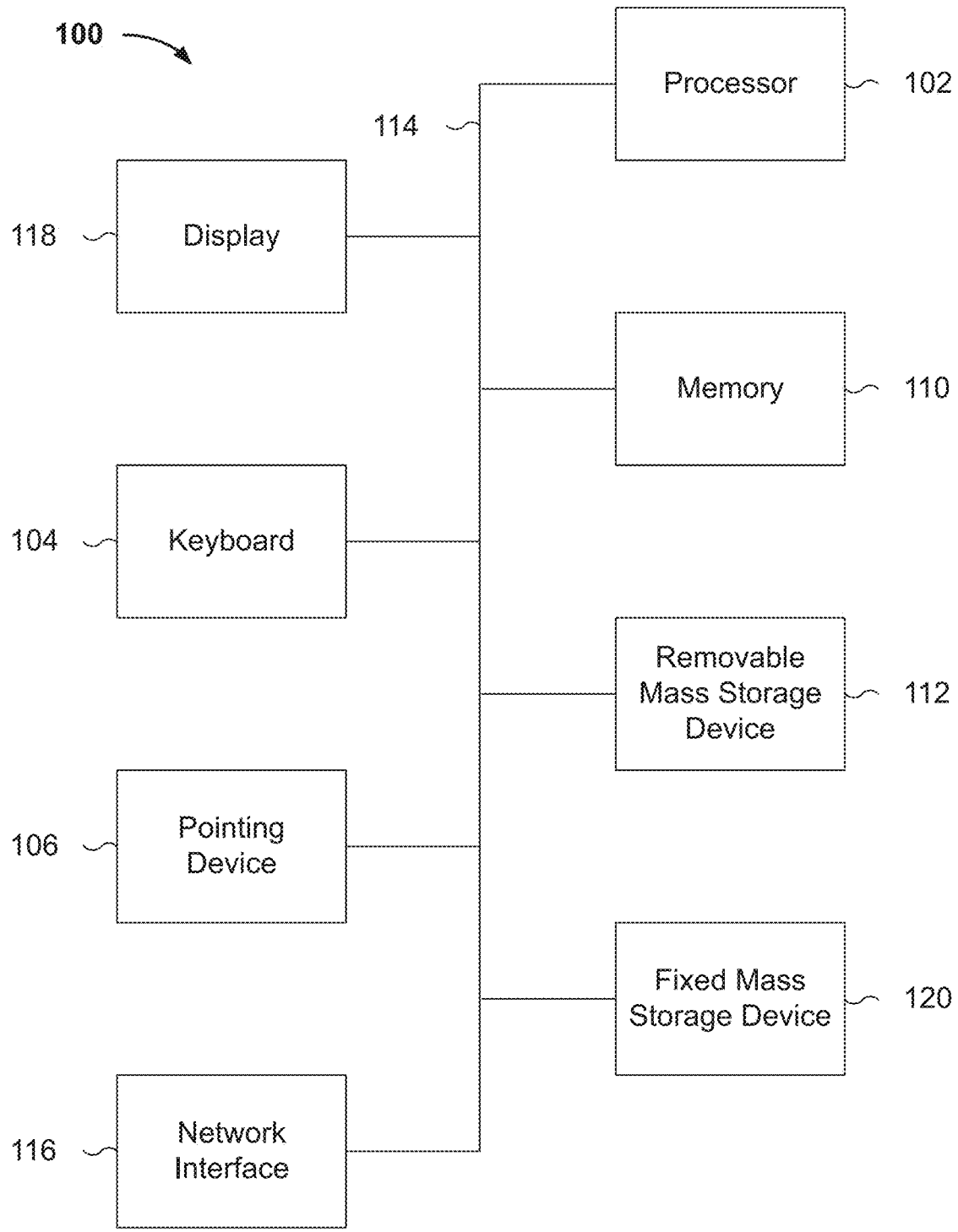
FIG. 1 is a functional diagram illustrating a programmed computer system for executing a product designer module configured to present an insurance product model and corresponding operational data in accordance with some embodiments.

FIG. 1 is a functional diagram illustrating a programmed computer system for executing a product designer module configured to present an insurance product model and corresponding operational data in accordance with some embodiments. As will be apparent, other computer system architectures and configurations can be used to present an insurance product model and corresponding operational data. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide product designer 202 described below with respect to FIG. 2 and/or executes/performs the processes described below with respect to FIG. 9.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
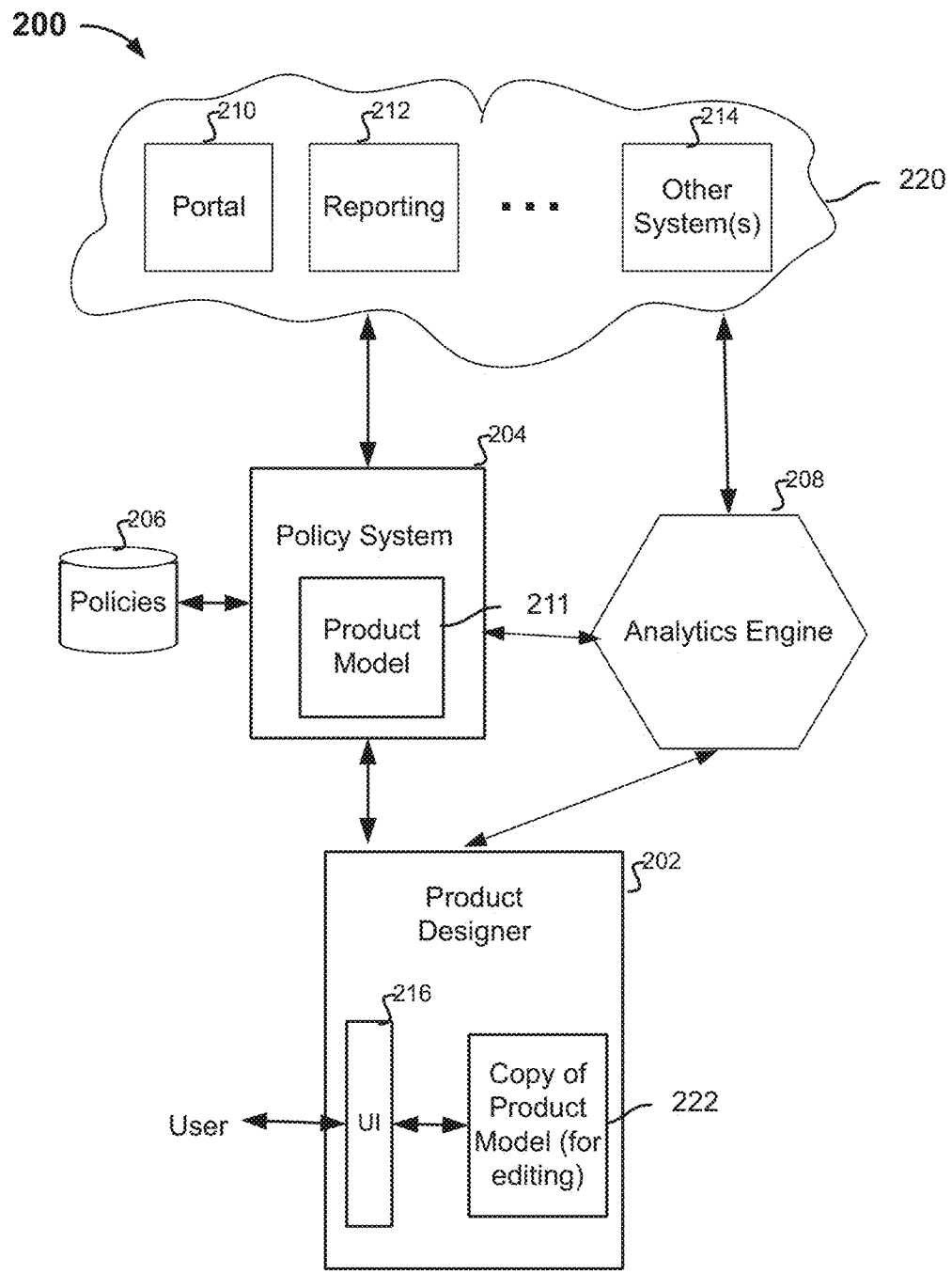
FIG. 2 is a block diagram illustrating an embodiment of a system for presenting an insurance product model and corresponding operational data.

FIG. 2 is a block diagram illustrating an embodiment of a system for presenting an insurance product model and corresponding operational data.

In this example, system 200 is shown to include product designer 202, policy system 204, and analytics engine 208. Product designer 202 is used to design, edit, and/or configure an insurance product model, and policy system 204 uses the insurance product model to construct and issue policies.

In the example shown, product designer 202 (e.g., Guidewire's Product Designer) is used to configure, edit, or design various insurance products and associated information, such as homeowner's insurance or auto insurance, which may include (for example): offerings, availability on policy lines, coverages, coverage terms, conditions, and exclusions. In some embodiments, product designer 202 resides on a web server and users can login and use product designer 202 remotely from web browsers running on their laptop or other networked devices. Policy system 204 (e.g., Guidewire's PolicyCenter) produces instances of these insurance products for individual policies and manages them. In various embodiments, the various policies and associated data are stored in policies database 206 or another appropriate location. In some embodiments, policies database 206 is included in and/or located within policy system 204.

In this example, policy system 204 is shown to include insurance product model 211. An insurance product model is a logical representation of insurance products and associated information, e.g., offered by a particular insurance company. An insurance product model specifies possible configurations of insurance policy products. In some embodiments, the insurance product model is implemented using XML files or other appropriate data structures. The insurance product model can be instantiated in the policy system's memory, and/or stored in a database.

In some embodiments, an insurance product model comprising insurance policy metadata is provided in a computer memory. A computer then serves to substantively interpret this insurance product model to facilitate obtaining supplemental policy-specific data. In other words, the policy system parses the insurance product model, determines availability (including available coverages, coverage terms, coverage term values), obtains selections made by the user, constructs an insurance policy based on the user selection and availability, etc.

In some embodiments, an insurance product model includes metadata that defines the structure of a plurality of derived policies. While the model may include information that forms part of the information included in the derived policies, it is distinct from, and shared across, all of the derived policies.

The insurance policy metadata may comprise, at least in part, data that defines elements of a corresponding insurance policy. Examples of metadata include, but are not limited to, data that defines policy lines, risk unit types, insurance coverage types, insurance coverage forms, contractual terms associated with insurance coverages ("coverage terms"), options associated with coverage terms, available endorsements, available choices for limits and deductibles, information about the availability of coverages, and so forth.

The supplemental policy-specific data can comprise information such as, but not limited to, actual coverage limits and coverage deductibles selected, coverage elections, risks being covered, a period of coverage, cost(s), applied endorsements, insured entity data, and so forth. By one approach the insurance policy metadata and the supplemental policy-specific data comprise separate and discrete data models and may, if desired, be stored separately from one another.

So configured, the insurance product model and the supplemental policy-specific data can be used to facilitate an insurance-related action, e.g., performed by the policy system, analytics engine, and/or product designer. Examples of insurance-related actions include, but are not limited to, creating a new insurance policy, determining whether an insurance policy provides coverage with respect to a particular event, collecting additional information with respect to a particular event, identifying at least one insurance policy that is available to offer to an entity from amongst a plurality of candidate insurance policies, providing information to a user regarding which risk units are permitted to be covered by a given corresponding insurance policy, and so forth (to note but a few examples).

The insurance product model can be used to support managing new policy lines, coverage types, or risk units without requiring reprogramming of a hardcoded policy product embedded in the software code of a policy administration application. Instead, such new information may be incorporated into insurance product model metadata, metadata which is then interpreted and used to collect additional policy-specific information, and which may further facilitate performing an insurance-related action. This, of course, can be accomplished with a great reduction in time and effort and with considerably reduced exposure to coding mishaps.

The insurance policy metadata may comprise, at least in part, data that defines elements of a corresponding insurance policy. The insurance policy metadata may also comprise, at least in part, data that is common to a plurality of derived insurance policies. Examples of metadata include, but are not limited to, data that defines a policy line (that is, a set of related risk types and coverages that, taken together, make up a coherent package of insurance), at least one risk unit type (that is, a thing or circumstance that may be exposed to loss, which may also include, for example, the parameters needed to correctly represent that risk type for purposes of determining coverage and calculating the premium), insurance coverage types (that is, a set of types of available coverage, which may also include, for example, the parameters needed to determine the possible values of limits and deductibles), insurance coverage forms, and so forth.

In addition, the insurance policy metadata may include contractual terms associated with insurance coverages. The contractual terms that can define the insurance policy metadata may comprise coverage limits, coverage deductibles and/or elective coverage options (that is, any configurable option of the coverage (such as, for example, whether a liability coverage includes actions taken by house guests in addition to actions taken by members of the household) that may be selected and may affect the scope of the coverage and the price to be charged). In addition, the insurance policy metadata may also include options associated with coverage terms or an available endorsement. The options associated with coverage terms may comprise a set of available coverage limits and/or available deductibles to choose from. The insurance policy metadata may further comprise information regarding availability of at least one item of insurance policy metadata as a function of at least one of a given jurisdiction, a given date or a given underwriting entity. For example, a specific coverage may only be available in a certain jurisdiction. Therefore, the insurance policy metadata would include information as to the availability of the specific coverage as it relates to a plurality of jurisdictions.

The insurance product model may also comprise a multiline or "package" policy model. For example, the insurance product model can be used to create a plurality of distinct policies by choosing appropriate policy-specific data. As another example, the insurance product model may contain information about multiple lines of coverage, which can then be combined in various ways to make up "package" policies.

In the example shown, product designer 202 is shown to include product model 222, which is a copy of product model 211. In this example, an existing product model 211 is active (i.e., live) and currently in use by insurance agents and brokers in the field, and product designer 202 has a copy of product model 211 (product model 222), which can be edited via user interface 216, which may be on a server or a client computer. In some embodiments, when the editing of product model 222 is complete, those changes are propagated to product model 211 at an appropriate point in time.

Network cloud 220 includes one or more services from which data is provided to policy system 204 and/or analytics engine 208. In this example, network cloud 220 is shown to include: portal 210, reporting tool 212, and other system(s) 214. In some embodiments, portal 210 is an internet-facing web site in which external consumers, policyholders, agents, or other users solicit quotations, purchase, and manage their insurance policies. In some embodiments, portal 210 is configured to tag various data, e.g., to indicate that it is associated with a particular marketing campaign, as will be more fully described below. Reporting tool 212 is a framework for monitoring and capturing channel interaction and use data for purposes of downstream analysis (e.g., Google Analytics or a similar click/access tool). Other system(s) 214 could be any other system/service that provides operational data to be provided to analytics engine 208.

In some embodiments, analytics engine 208 is a downstream reporting tool that receives data from policy system 204 and system(s) in network cloud 220 and provides operational data to product designer 202. In some embodiments, analytics engine 208 is configured to transform and/or perform calculations on the data it receives in various ways to facilitate real-time analysis and viewing of results. Product designer 202 is configured to use the operational data to augment views of the insurance product model in user interface 216, which assists the user with making decisions on what edits or changes to make to the insurance product model.

In some embodiments, receiving a feed of operational data at product designer 202 is an additional service or add-on package associated with product designer 202 and/or policy system 204, e.g., insurers might pay extra for this enhanced channel delivery service that provides operational data to product designer 202. For example, either analytics engine 208 and/or a feed containing the operational data either from analytics engine 208 or directly from policy system 204 might be available on a monthly subscription basis. In some embodiments, analytics engine 208 is located within policy system 204.

FIG. 3A is a diagram illustrating an embodiment of an interface for editing an insurance product model. User interface 300 is an example of user interface 216. When a user logs into product designer 202, the user may be presented with user interface 300. In this example, the left side of user interface 300 includes a panel 302, which displays a navigation tree that a user can navigate through to see all the elements in the insurance product model. Selecting an element in the navigation tree causes information about that item to be displayed on the right hand side 304 for viewing and/or editing. For example, details and/or editable fields associated with that element may be presented on the right hand side. In user interface 300, "Policy Lines" is shown as highlighted since that is what is currently selected. As a result, all the available policy lines are displayed on the right hand side 304.

In panel 302, five sections of an insurance product model are shown, including: Audit Schedules, Policy Lines, Products, Question Sets, and System Tables. In the example shown, because "Policy Lines" is selected, all available policy lines are displayed beneath "Policy Lines" in the navigation tree (i.e., Businessowners Line, Commercial Auto Line, Commercial Property Line, General Liability Line, Inland Marine Line, Personal Auto Line, and Workers' Comp Line). Selecting other sections will cause elements of the insurance product model corresponding to the selected section to be displayed.

FIG. 3B is a diagram illustrating an embodiment of an interface for editing an insurance product model showing the navigation tree more fully expanded. As shown in the navigation tree, "Death & Disability Benefit" is currently selected, which falls under "Coverages," which falls under "Personal Auto," which falls under "Policy Lines" (specifically, the personal auto policy line).

In some embodiments, the elements in the navigation tree map directly to elements of the insurance product model. Thus, the navigation tree and the insurance product model can be implemented using similar data structures such as the graph structure described below.

Figure 4:
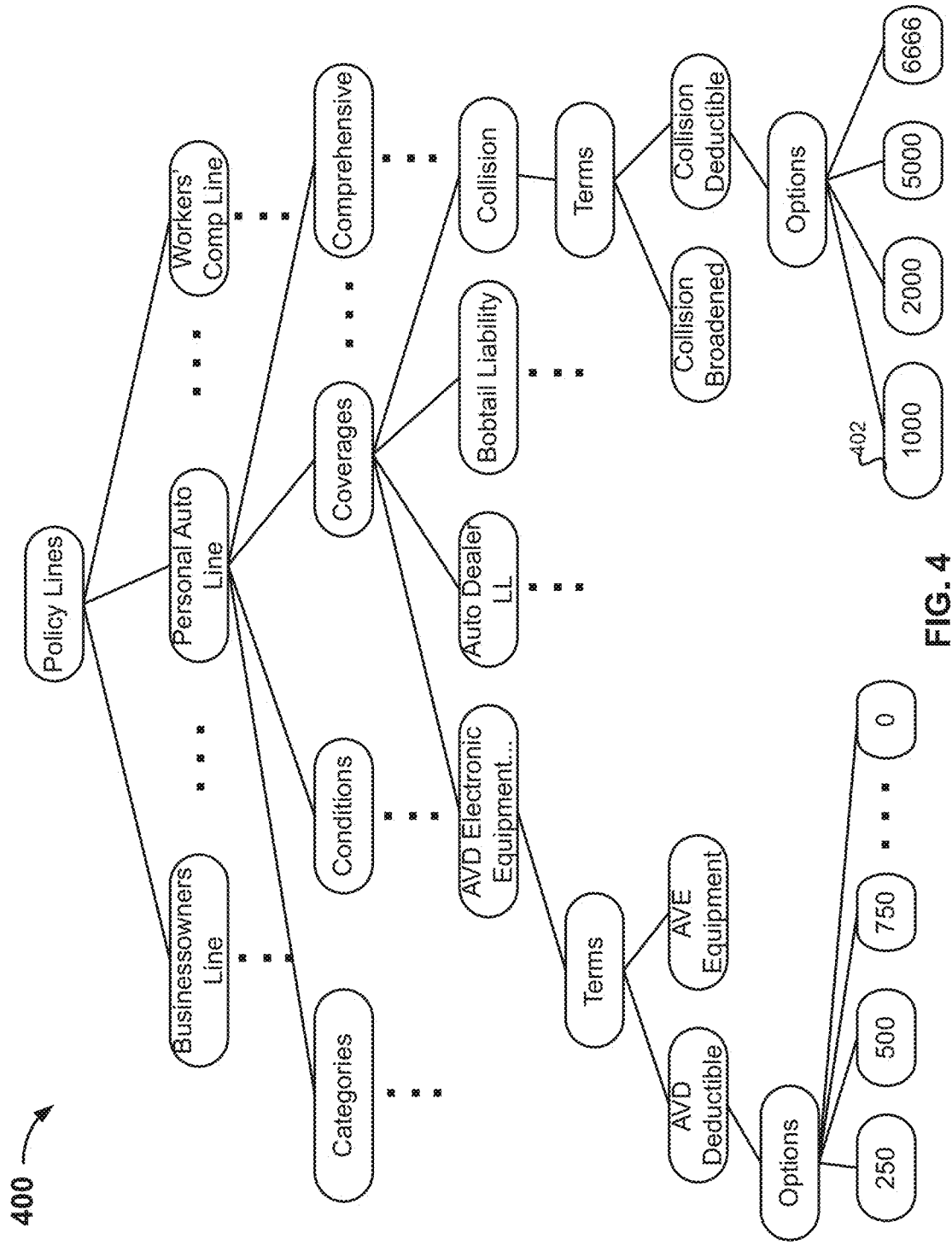
FIG. 4 is a diagram illustrating an embodiment of an insurance product model graph structure.

FIG. 4 is a diagram illustrating an embodiment of an insurance product model graph structure. In this example, an insurance product model is represented using graph structure 400, which is an example of how the insurance product model might be organized and/or stored. Each node in graph structure 400 maps to an element in the insurance product model. (In this figure, the horizontal and vertical ellipses ( . . . ) indicate that there are other nodes in between or following the ellipses.) In some embodiments, each node in graph structure 400 maps to an element in the navigation tree shown in FIGS. 3A-3B.

Figure 5:
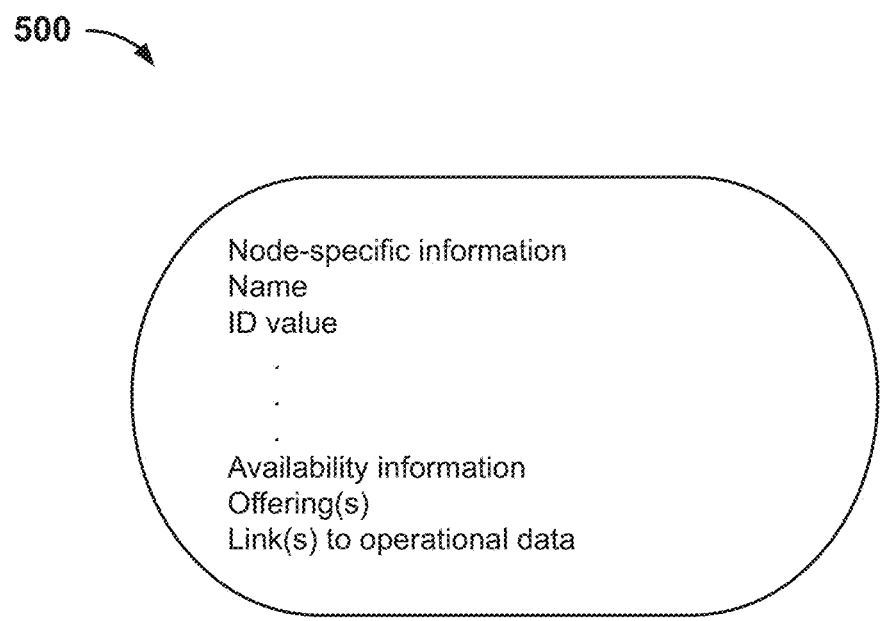
FIG. 5 is a diagram illustrating an embodiment of a node of an example insurance product model graph structure.

FIG. 5 is a diagram illustrating an embodiment of a node of an example insurance product model graph structure. In this example, node 500 is an example of one of the nodes shown in graph structure 400. For example, node 500 could be node 402 (Option 1000) in FIG. 4.

Node 500 is shown to include the following fields: Node-specific information; Name; ID value; Availability information; Offering(s); and Link(s) to operational data. Availability information could include available state(s), available date(s), policy type(s), effective date(s), line(s) of business, jurisdiction(s), underwriting company(ies), business unit(s), rules regarding whether availability is grandfathered in (e.g., whether a customer can keep an option that is no longer available next year when they renew, or must select one of the new choices), etc. Availability criteria are configurable by the individual customer. In some embodiments, availability criteria include logic or rules that prescribe under what conditions a particular node in the product model should be allowed at runtime. Criteria can be configured using a UI (often table-driven or with a set of simple checkboxes), or more sophisticated logic can be described using a programming (scripting) language. As used herein, an offering refers to a subset of the insurance product model tree, possibly with default values that differ from the regular default values. For example, there could be different levels of an insurance product, such as Silver, Gold, and Platinum product offerings, and some items may only be available as part of a Platinum product offering. The product offerings for which this node is available would be listed under Offering(s). In some embodiments, Offering(s) is part of Availability information. Availability information and Offering(s) are both examples of availability indicators, which refers to any field or other data structure that indicates availability information regarding a product or feature associated with a particular node or element in an insurance product model.

For example, node 402 could have the following field values:
Node-specific information field(s)
Name: Option 1000
ID value: 523
Availability information:
Available states: CA; OR
Available dates: CA: Jan. 1, 2013; OR: Jan. 1, 2014
Policy Type: Personal Auto Line
Offering(s): Standard Offering, Platinum Product Offering
Link(s) to Operational Data:
Number of bound policies as a function of availability indicators (e.g., state, date, offering)
Number of quotes as a function of availability indicators (e.g., state, date, offering)

Thus, option 1000 is available in California starting Jan. 1, 2013 and available in Oregon starting Jan. 1, 2014. It is a personal auto line policy type and part of the standard offering and the platinum product offering.

As used herein, operational data can include any insurance lifecycle or transactional data (e.g., quotes, policies, claims, and billing data), tags or other metadata. In some embodiments, a tag is metadata that is carried along a policy throughout its transactional lifecycle (lifetime) that flows through the system, e.g., from a web portal or a phone call down to a product designer. For example, tags may be associated with campaigns, as more fully described below. Further examples of operational data will be more fully described below.

In some embodiments, by accessing a node, operational data corresponding to that node can be obtained via the link(s). In some embodiments, the link is to operational data stored in product designer 202, policy system 204, and/or analytics engine 208. In some embodiments, at least some of the operational data is stored at product designer 202 and obtained from analytics engine 208 and/or policy system 204.

Figure 6:
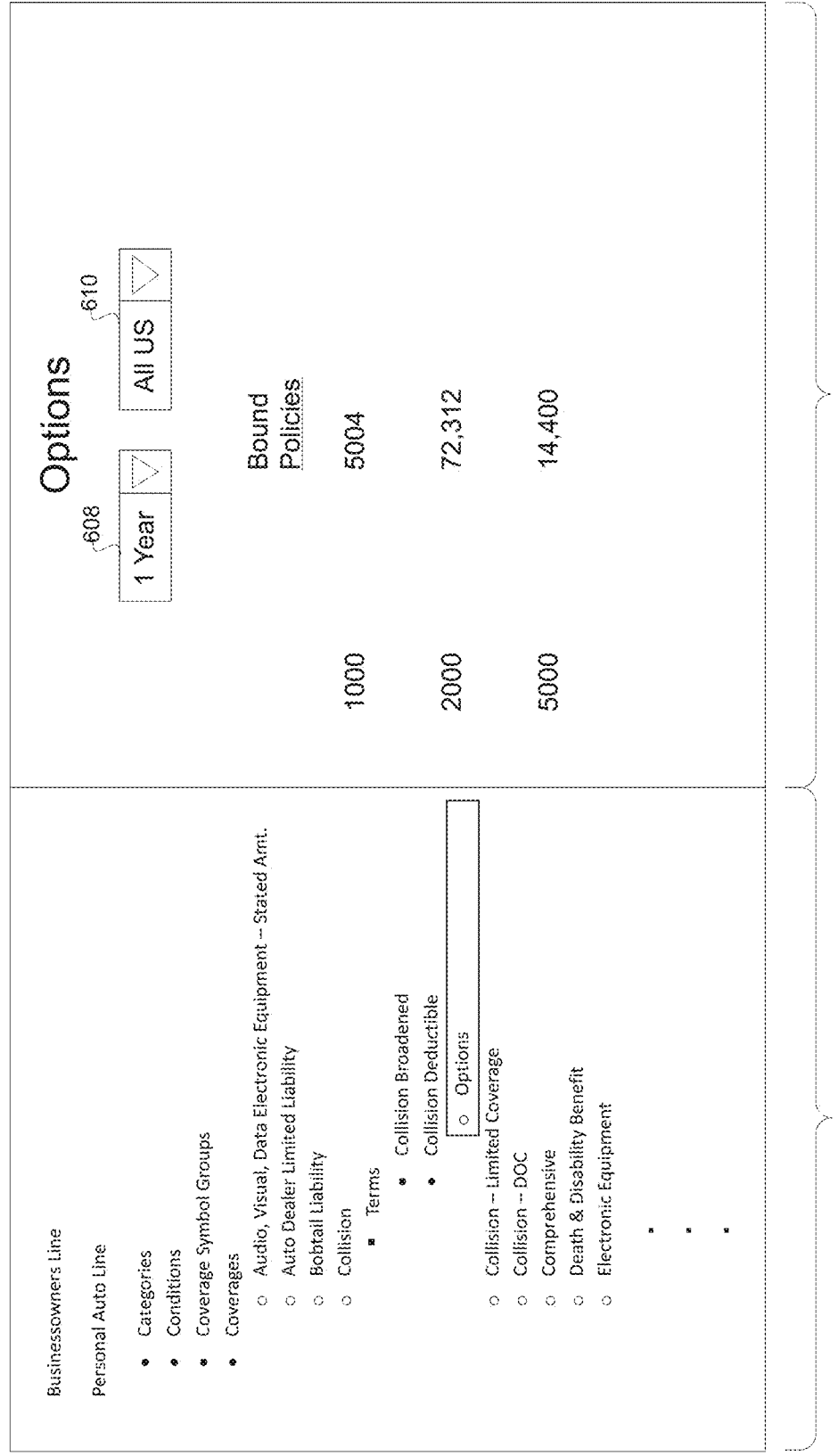
FIG. 6 is a diagram illustrating an embodiment of a product designer user interface for displaying an insurance product model and corresponding operational data.

FIG. 6 is a diagram illustrating an embodiment of a product designer user interface for displaying an insurance product model and corresponding operational data. For example, the user interface shown could be user interface 216. In some embodiments, user interface 600 is displayed in response to a user selecting various nodes down the product model tree—first "Policy Lines," then "Personal Auto Line," then "Coverages," then "Collision," then "Terms," then "Collision Deductible," then "Options" from the product model tree shown in panel 602 (See also FIGS. 3A and 4).

In this example, "Options" is highlighted, which indicates that it is currently selected. Panel 604 presents operational data associated with the various options. In this example, the three options in the product model are $1000, $2000, and $5000. In this example, the operational data comprises the number of bound policies added within a given time period. Filtering pull down menus 608 and 610 allow the user to filter the operational data by time period and state, respectively. Thus, within the past one year, for all 50 states (All US), there were 5004 added bound policies with a $1000 deductible, 72,312 added bound policies with a $2000 deductible, and 14,400 added bound policies with a $5000 deductible.

In various embodiments, the operational data is obtained directly or indirectly from policy system 204 and/or services or systems within network cloud 220. In some embodiments, the operational data is obtained from analytics engine 208, which rolls up aggregate operational data from policy system 204 and/or services or systems within network cloud 220.

Providing the operational data augments the view of the insurance product model with data about actual policies. Instead of just having a design environment specifying the insurance product model itself, operational data provides analytic data gathered from the running system, thus providing feedback on how one might edit the insurance product model. For example, by looking at the number of bound policies associated with each option, one can determine which options are popular and which are not. If an option is unpopular, the administrator may decide that it should be removed. In some embodiments, operational data also includes profit related data. If an option is least profitable or unprofitable, the user may choose to remove it. Thus, the same user who is editing the insurance product model can also be the user making the decisions based on operational data associated with the real product.

In some embodiments, there could be policies in force that were issued at a time when not all the choices of options were available for some period of time, so it is possible to filter by the period of time when the customer could select all the options (i.e., filter by the viable set) in order to do a fair comparison. In some embodiments, the option to filter by viable set or period of time would be automatically provided.

In some embodiments, one or more of the filtering pull down menus is automatically generated based on the configuration of the insurance product model, e.g., by examining what operational data is available for the insurance product model node element(s) being displayed. In some embodiments, panel 604 is customizable and the user may specify one or more desired fields to be used in the filtering criteria. Therefore, the fields may vary depending on the available operational data and/or the user.

In some embodiments, the filters could be configured and/or defined by the user—either via a series of preferences or via a script.

In some embodiments, rather than or in addition to filtering by what to include (as shown in user interface 600), the user can filter by what to not include, or exclude. For example, user interface 600 could include another section in the options field for the user to specify this.

In some embodiments, each filtering criterion specifies at least one value corresponding to at least one of the set of availability indicators (see FIG. 5) in at least one node or field of the insurance product model. In this example, the filtering criteria include: State and Time Period. The filtering criteria could also include Product Offering, as will be described in the next example.

Figure 7A:
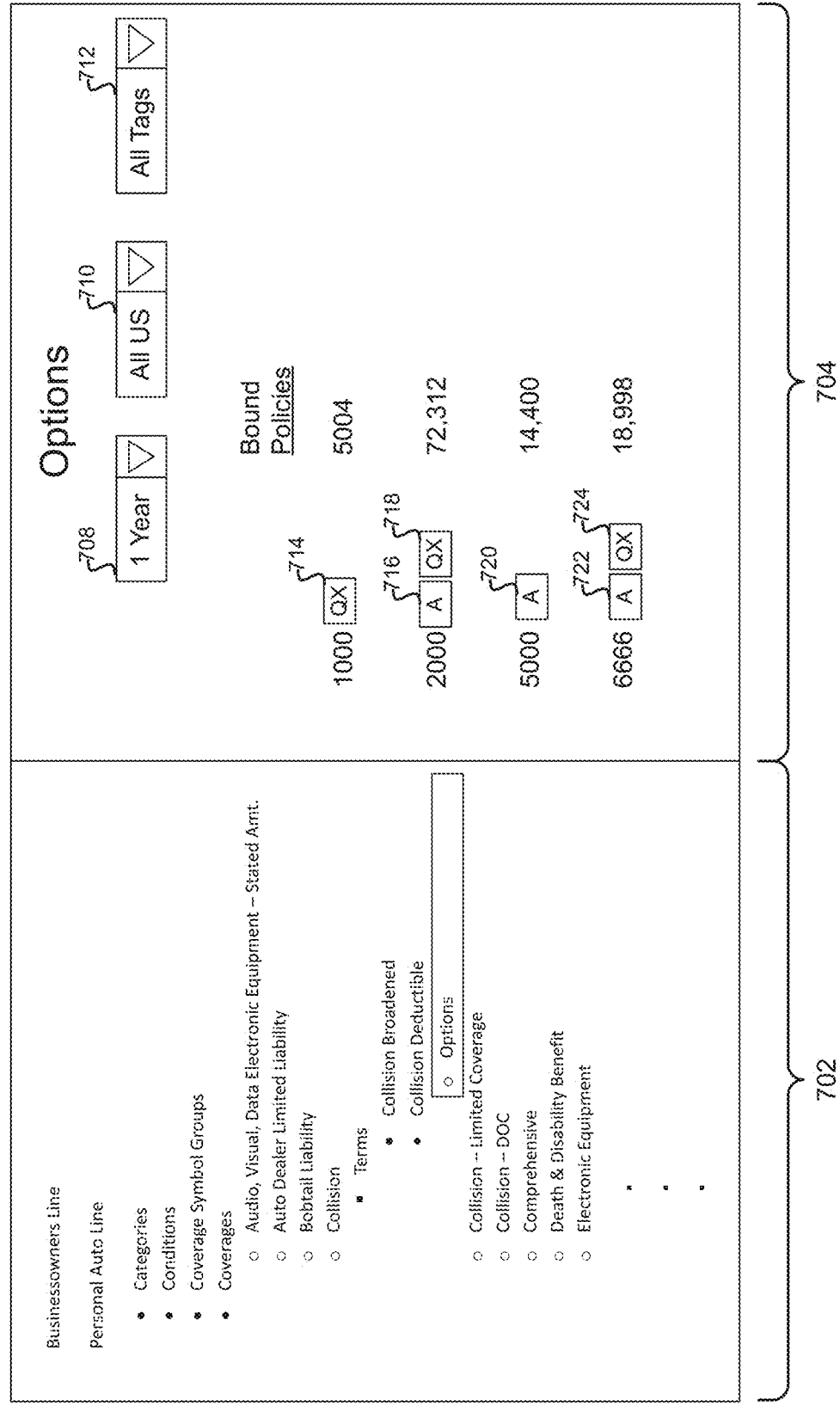
FIG. 7A is a diagram illustrating an embodiment of a product designer user interface for displaying an insurance product model and corresponding operational data, including an option to filter displayed operational data by tag.

FIG. 7A is a diagram illustrating an embodiment of a product designer user interface for displaying an insurance product model and corresponding operational data, including an option to filter displayed operational data by tag. For example, the user interface shown could be user interface 216. In some embodiments, user interface 700 is displayed in response to a user selecting various nodes down the product model tree—first "Policy Lines," then "Personal Auto Line," then "Coverages," then "Collision," then "Terms," then "Collision Deductible," then "Options" from the product model tree shown in panel 702 (See also FIGS. 3A and 4).

In this example, "Options" is highlighted, which indicates that it is currently selected. Panel 704 presents operational data associated with the various options. In this example, the four options in the product model are $1000, $2000, $5000, and $6666. In this example, the operational data comprises the number of bound policies added within a given time period. Filtering pull down menus 708 and 710 allow the user to filter the operational data by time period and state, respectively. Thus, within the past one year, for all 50 states (All US), there were 5004 added bound policies with a $1000 deductible, 72,312 added bound policies with a $2000 deductible, 14,400 added bound policies with a $5000 deductible, and 18,998 added bound policies with a $6666 deductible.

Filtering pull down menu 712 allows the user to filter the operational data by tags. For example, some bound policies are associated (or tagged) with a tag that indicates a marketing campaign (or product offering) that that bound policy came in from. An offering could be created for a specific marketing campaign. For example, there could be a tag "QX" associated with an ABC marketing campaign offering a special product offering in which the $6666 deductible is available instead of the $5000 option. In some embodiments, at the time an insurance policy becomes bound (i.e., when the customer signs up), that insurance policy is associated with a campaign tag. In some embodiments, each quote is associated with a campaign tag. In some embodiments, campaigns are defined in the product model (via Offerings), and in the user's workflow, their decision is routed back into setting and/or adjusting the offering. Thus the user is able, within Product designer, to then make (and track) changes.

In some embodiments, various tags and options are presented for the user to select to associate with a campaign or other information, e.g., at portal 210 or possibly at product designer 202 and propagated upstream, e.g., to portal 210 and/or policy system 204.

In various embodiments, insurance carriers can tag their policies with metadata that indicates how the customer arrived and/or under what campaign the customer arrived (e.g., web, link from campaign, a URL on a TV ad during the Super Bowl, what campaign was in effect when the customer went through the sales process, what options were presented to the customer, what options the customer picked and didn't pick, etc.). Tags can be used to indicate any of this information.

As an example, looking at system 200, when prospective customers see an ad advertising the QX campaign on a third-party website such as the ABC website, they would be directed to a special URL that takes them to a special landing page for inbound ABC customers on web portal 210. The web portal tags all data associated with this special URL with tag "QX," which then gets passed through to analytics engine 208, through to product designer 202. When a user filters the operational data based on tag "QX," then only the data tagged "QX" is included in the operational data displayed in user interface 216.

In some embodiments, one or more tag indicators (or buttons) are displayed next to each deductible option and are used to show which deductible options are (or were) available under that marketing campaign or tag. For example, tag indicators 714, 718, and 724 are displayed adjacent to deductible options 1000, 2000, and 6666 to show that these deductible options are available under the "QX" campaign. Tag indicators 716, 720, and 722 are displayed next to deductible options 2000, 5000, and 6666 to show that this deductible option is associated with the "A" tag, which could be used to indicate some other operational data. For example, "A" could indicate the inbound channel or mode by which a policy came in, such as by telephone and the $1000 option is only available by web (which is why there is no "A" tag indicator next to the $1000 option).

Currently, in filtering pull down menu 712, "All Tags" is selected, and therefore, the operational data is not filtered by tags. A user may choose to filter by a tag by either selecting a tag in filtering pull down menu 712 or selecting a tag indicator (button). For example, by filtering by tag "QX," the user can determine how many customers came in from the ABC marketing campaign.

Figure 7B:
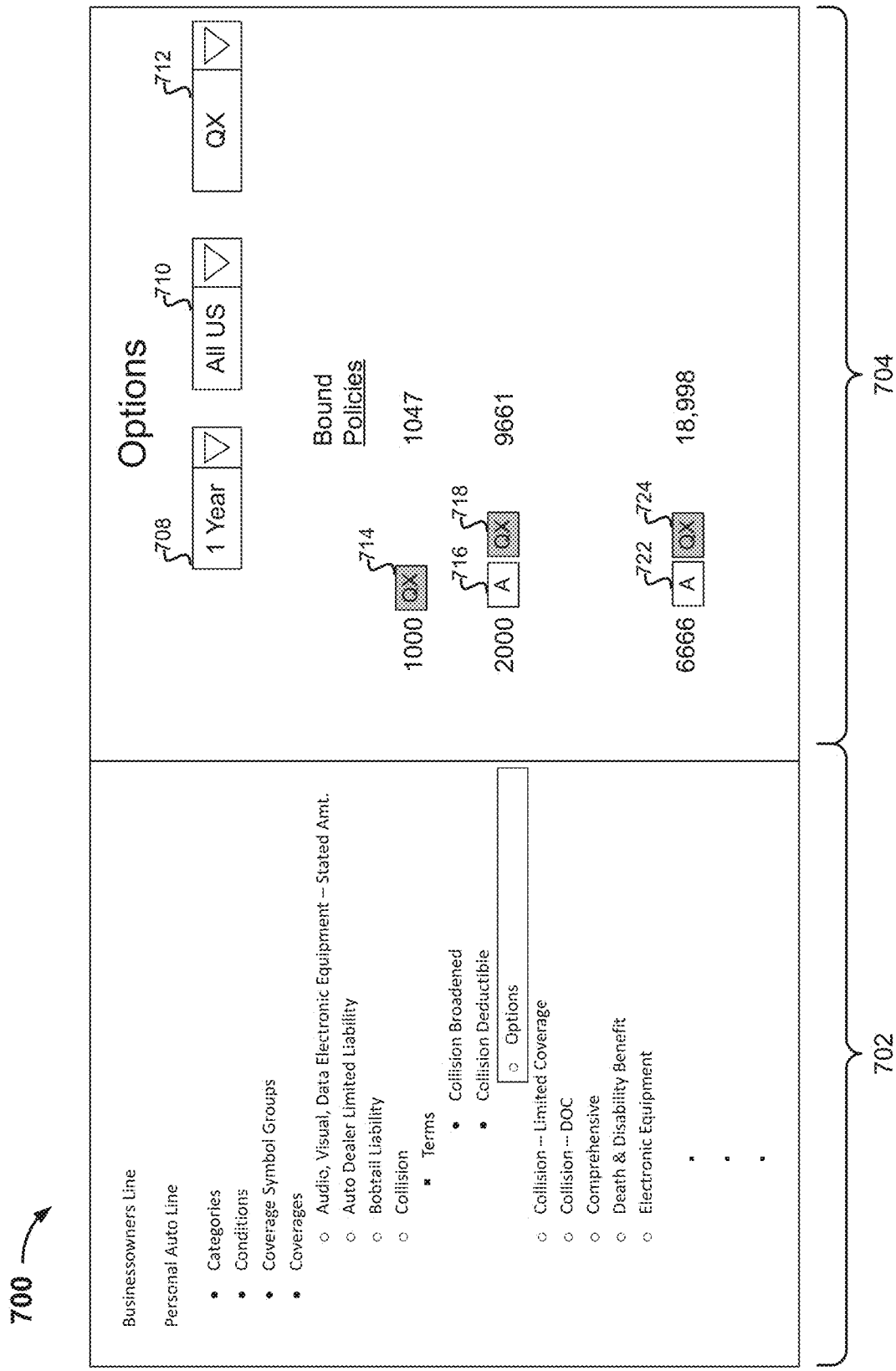
FIG. 7B is a diagram illustrating an embodiment of a product designer user interface for displaying an insurance product model and corresponding operational data, in which the operational data is filtered by a tag.

FIG. 7B is a diagram illustrating an embodiment of a product designer user interface for displaying an insurance product model and corresponding operational data, in which the operational data is filtered by a tag. In this example, a user has chosen to filter the operational data shown in FIG. 7A by either selecting "QX" in filtering pull down menu 712, or selecting "QX" indicator button 714, 718, or 724. In response, the operational data has been updated to filter by "QX." "QX" is shown as selected in filtering pull down menu 712 and "QX" indicator buttons 714, 718, and 724 are highlighted. Thus, within the past one year, for all 50 states (All US), coming in from the QX campaign, there were 1047 added bound policies with a $1000 deductible, 9661 added bound policies with a $2000 deductible, and 18,998 added bound policies with a $6666 deductible. Because the $6666 deductible was only available under the QX campaign, the number of added bound policies (18,998) for the $6666 deductible is the same in FIG. 7A and FIG. 7B.

Note that the deductible option $5000 is not displayed in FIG. 7B. This is because under the QX campaign, the 5000 option was not available. Thus, the insurance product model options or elements that are not applicable or not available under a particular filtering option are not displayed in some embodiments. In this example, only options offered under the QX campaign are presented. In some other embodiments, some other indication that the insurance product model options or elements are not applicable or not available may be used, e.g., those option(s) may be grayed out.

In some embodiments, there is more than one filtering pull down menu associated with a tag. For example, another filtering pull down menu might be available in this interface so that the user could select "A" and "QX" simultaneously and filter by both these tags.

Figure 8A:
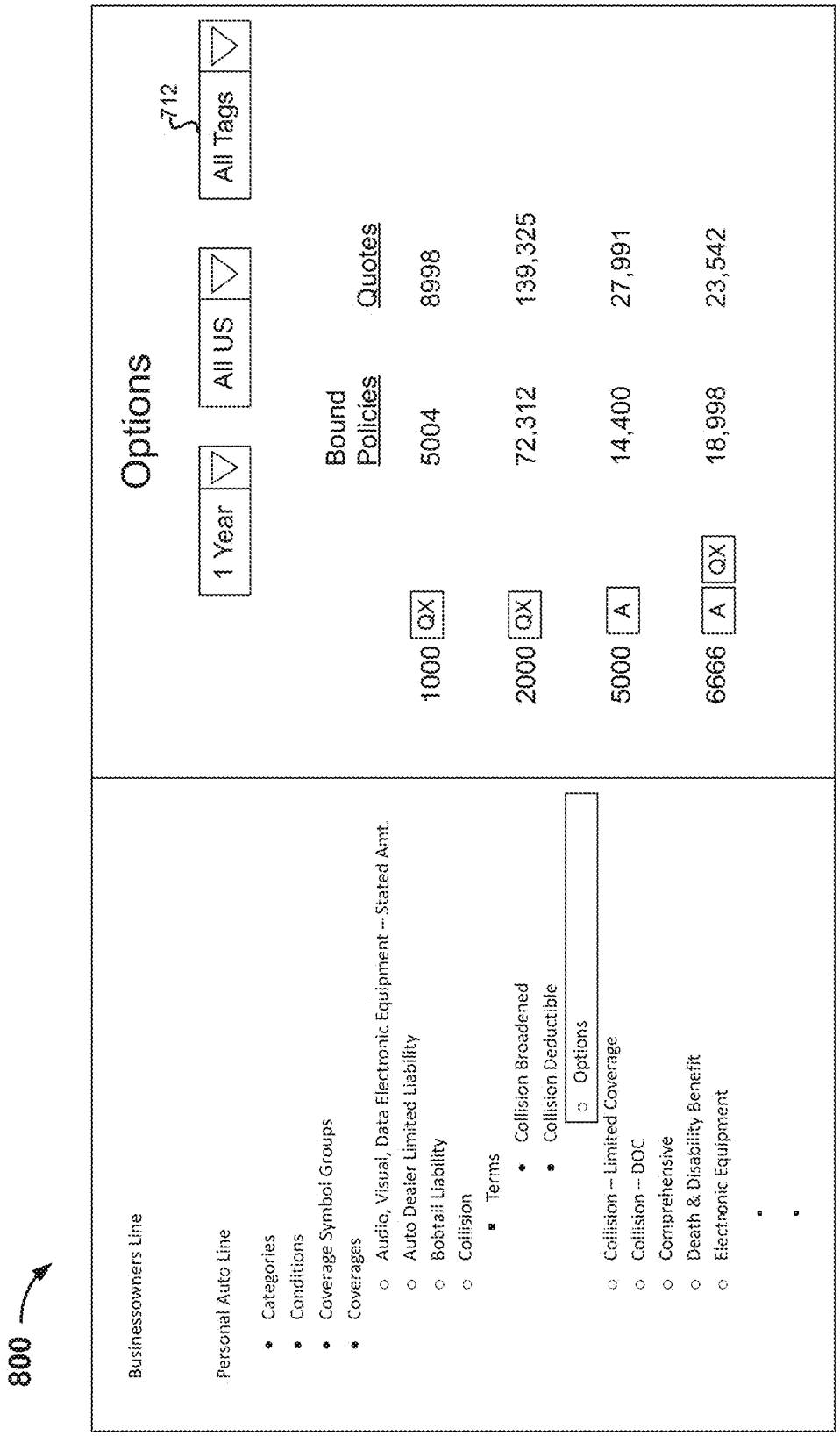
FIG. 8A is a diagram illustrating an embodiment of a product designer user interface for displaying an insurance product model and corresponding operational data, in which additional operational data is shown.

FIG. 8A is a diagram illustrating an embodiment of a product designer user interface for displaying an insurance product model and corresponding operational data, in which additional operational data is shown. For example, the user interface shown (800) could be user interface 216. In this example, in filtering pull down menu 712, "All Tags" is selected, and therefore, the operational data is not filtered by tags.

In some embodiments, other operational data is shown besides the number of bound quotes. In the example shown, the number of quotes (that have not necessarily become bound policies) is also shown for each of the deductible options so the user can better understand the rate of conversion from quotes to bound policies. In various embodiments, any other operational data may be displayed besides how many policies are bound and how many are quotes. For example, operational data can include a variety of information and statistics that can be measured by web portal 210 (or derived from this information, e.g., by policy system 204 or analytics engine 208), such as take rates, fall-off rates, how long a customer viewed each option before picking a value, whether they changed that value, how many times they changed that value, and any other user behavior related data, etc. In some embodiments, a "take rate" includes the percentage of times that the customer decides to purchase after viewing a specific quote. In some embodiments, a "fall-off rate" includes the number of times that a customer cancels the quoting process (e.g., by closing the web browser) at a given step or after viewing a particular quote. Operational data can also include any information that can be tagged by portal 210 or any of the other services, such as tags associated with inbound channels (e.g., did the customer come via the phone or web) or which marketing campaign the customer came in on. Other examples of operational data include any insurance transactional (lifecycle) data, such as policy claim and billing data, in addition to data sourced from a policy system (e.g., policy system 204). Examples of policy claim and billing data include: number of claims, claim rate, losses, loss ratios, inbound premiums on policies with each option, a percent fraudulence that can be correlated with the product model element, a profitability on each option that can be estimated within a margin of error, etc. Thus, within a given set of options, for one coverage term, for one coverage, various data associated with how business performs around each option can be viewed. In various embodiments, other reasons to apply a new tag, could include various computed or observed characteristics of the customer, such as: particular device type used; whether they resumed a quote that was paused in a previous engagement; whether they were insured previously; or whether they were handed off to our portal from an aggregator or comparison shopping site. In various embodiments, live or other sources of data could be used. An example is statistics on population growth or crime rates to drive changes in what is offered.

In various embodiments, the operational data can be presented in various ways or formats besides displaying raw numbers. For example, a bar graph, a pie chart, or other graphic could be used to visually convey the operational data, such as trend over time, or percentage. In some embodiments, the way the operational data is displayed is user configurable, e.g., there may be options presented from which the user may select.

In some embodiments, which operational data is displayed is user configurable. For example, the user may select from multiple options of what operational data to display or specify their own options. In some embodiments, one or more of options is automatically generated based on the configuration of the insurance product model, e.g., by examining what operational data is available for the insurance product model node element(s) being displayed. Therefore, the operational data displayed may vary depending on the available operational data and/or the user's configurations.

In some embodiments, scripts may be used to specify desired operational data to be displayed. In some embodiments, one or more scripts are provided that may be customized by the user.

In some embodiments, the operational data can be linked back to a page with more information regarding that operational data. For example, clicking on "8998" might cause a cloud analytics tool to open. The cloud analytics tool might provide data associated with details of the web interactions associated with the quotes, such as click through data. The cloud analytics tool could be an interface to analytics engine 208 or a portion of policy system 204 that manages the operational data.

FIG. 8B is a diagram illustrating an embodiment of a product designer user interface for displaying multiple views at one time. In some embodiments, the user may display multiple filtered views at one time on a single object in order to compare results given different criteria. For example, the user interface shown displays a comparison of how a set of options is purchased in a particular state versus in the country as a whole.

FIG. 8C is a diagram illustrating an embodiment of a product designer user interface that includes visual feedback. In some embodiments, Product Designer provides visual feedback and additional statistical information to help users design and analyze the product model. In this example, Product Designer is providing a percentage difference to the user which alerts the user (via color, in this case) to the fact that in California, the largest option (5000) is disproportionately favored by Californians versus the country at large.

In some embodiments, this statistical data could be configured, either via preferences (choosing options or turning off and on) to meet particular business needs.

In some embodiments, this data could be exported to a common data format, such as CSV (comma separated values) for further statistical analysis in other tools (such as Excel)

In some embodiments, the user could save some filters and easily bookmark them so they could return to the information at a later point in time. These saved filters could then enter into a comparison screen (like the one above) to compare with historical trends (For example—If a user saves this filter, then makes some changes to the product model, the user can return back to it 6 months later and run the same filter with a new set of date criteria, which will show the user whether something has improved during that time frame).

FIG. 8D is a diagram illustrating an embodiment of a product designer user interface that includes a user note. In some embodiments, a user may want to note that they made a particular change in the product model due to trends or information they received via these data hooks/filters. Product Designer could have a button (or other interface) to save the current view and include a note from the user, such as "Made adjustments to California availability of high-deductibles given data which suggests they are more popular in coastal regions." This set of changes, along with data and note, could be reviewed by a supervisor or referenced for an audit at a later date.

As such, the user interfaces shown in FIGS. 6-8 may be used to help design and analyze an insurance product model by presenting operational data associated with each insurance product model element and providing different perspectives or filters on that operational data. Using this user interface, the user can tune and tweak the insurance product model based on market factors, such as competition, price, marketing, instinct, etc.

A couple of practical examples follow.

Example 1

A user is analyzing the QX campaign in California. The user selects 1 year, CA, and QX in the filters. For each deductible option, a fall off rate (rate at which people give up, close browser, and move on) is displayed. Option $1000 has a much higher rate, i.e., people select $1000 and then they fall off at a much higher rate. The user suspects that the $1000 deductible might have a premium that scares off customers, so the user might create a variant of QX, called QX2, in which $2000 is set as the default deductible, so when people come in on that campaign, they see a lower price for the premium. In some embodiments, the user would create a variant and give it an additional tag, and all the inbound customers would get the QX tag, but the ones shunted to the variation would also get the "QX-V2" tag, for example. This way, the user can see everyone in the whole campaign, just the ones in the variant, or just the ones in the original. In some embodiments, there is an ability to specify a filter on negative tags: the absence of a particular tag. The filter "QX and NOT QX-V2" would give all the original tags.

The user sets up an analysis in the insurance web portal (e.g., portal 210 in FIG. 2) based on this new campaign variant QX2. When a prospective customer arrives at the landing page for QX in web portal 210 starting tomorrow, half the time, web portal 210 is configured to send them to QX2 instead. All quotes or bound policies (or other data) associated with QX2 are tagged QX2 at web portal 210. (In some embodiments, specific types of tags and options are presented by web portal 210 for the user to select.) This data gets fed to analytics engine 208, which can then be provided to product designer 202. A few days later, the user can go back to product designer 202 and view operational data associated with each of the deductibles QX and QX2 and compare what the take rates are, and potentially change the QX campaign to have a 2000 default deductible if it results in an improved take rate.

In some embodiments, the product designer (or the analytics engine) might also provide statistical analysis or transformation of the data—so it will also indicate whether the take rate improved meaningfully (e.g., in a statistically significant manner). In some embodiments, logic or configuration for logic is provided that will turn raw data into something more specific (not just raw data of whether click rates went up after a change, but some comparison against historical data to show that click rates always go up after the holidays, for example).

Example 2

Assume that the user works for an insurance carrier named XYZ corp. In Florida, a competitor of XYZ, ABC insurance company, just moved into the state, and they are offering a lower deductible or special feature on their policies than XYZ. The user would like to understand what, if anything, to alter in his products to remain competitive. The user may view, in product designer 202, how a deductible performs over a period of time. The user can check product designer 202 to see how many people buy insurance from XYZ in the two weeks before ABC began selling their competing insurance product and two weeks after.

As illustrated by these two examples, a user might adjust a marketing campaign or offering based on the operational data presented. In some embodiments, web portal 210 presents advertising campaign information and there are options provided to adjust the campaign. In some embodiments, product designer 202 provides options to adjust the campaign, and information gets propagated upstream (e.g., to web portal 210 and/or policy system 204) as appropriate. In some embodiments, there is historical tracking of what changes were made and why, so that the user is able to understand why the user or others may have made various changes. For example, the user may want to know why the take rate has gone down or why something changed—they can see that another user identified a competitive threat and changed the market in their area or understand if there were other factors in this area.

Thus, at design time, users are presented with operational data to help make sure they are making rational decisions as they design and/or edit the insurance product model. Viewing relevant operational data in the context of the insurance product model is useful for making changes for competitive or other reasons. In addition, viewing the latest operational data at design time, as opposed to having to wait to receive decisions from a marketing analysis based on possibly outdated data, is also more timely and efficient.

Figure 9:
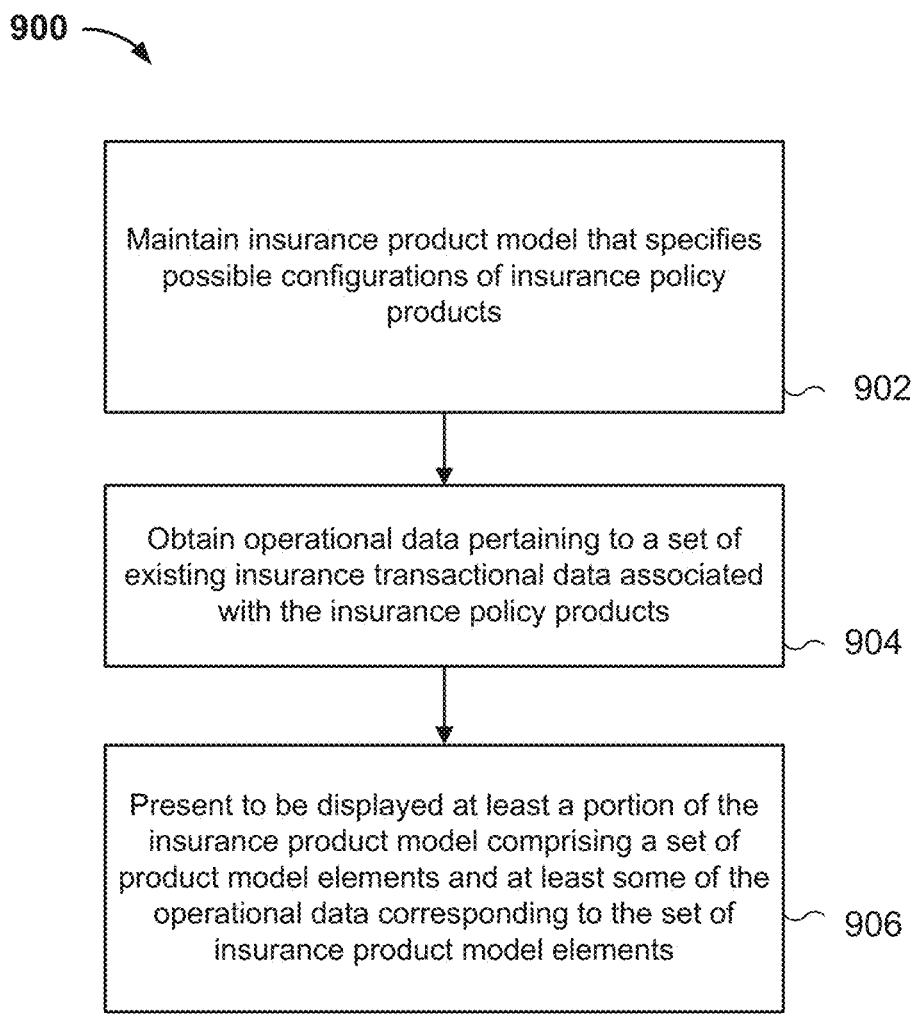
FIG. 9 is a flowchart illustrating an embodiment of a process for presenting an insurance product model and corresponding operational data.

FIG. 9 is a flowchart illustrating an embodiment of a process for presenting an insurance product model and corresponding operational data. In some embodiments, this process is performed by product designer 202.

At 902, an insurance product model that specifies possible configurations of insurance policy products is maintained. For example, insurance product model 222 is maintained.

At 904, operational data pertaining to a set of existing insurance transactional data associated with the insurance policy products is obtained. Examples of operational data include: statistics, tag information (e.g., identifier for campaign or inbound channel), policy, claim, and billing information, as more fully described above. Examples of insurance transactional data include data associated with policies, quotes, claims, billing, etc., as more fully described above. In some embodiments, the operational data is obtained from analytics engine 208, policy system 204, and/or product designer 202, any of which may have obtained and/or derived operational data from portal 210, reporting tool 212, and/or other system(s) 214. In some embodiments, it is possible to obtain operational data directly from portal 210, reporting tool 212, and/or other system(s) 214.

At 906, at least a portion of the insurance product model comprising a set of product model elements and at least some of the operational data corresponding to the set of insurance product model elements are presented to be displayed. For example, the insurance product model elements could be the deductible options $1000, $2000, and $5000, and the operational data could be 5004, 72,312, and 14,400 in FIG. 6.

Figure 10:
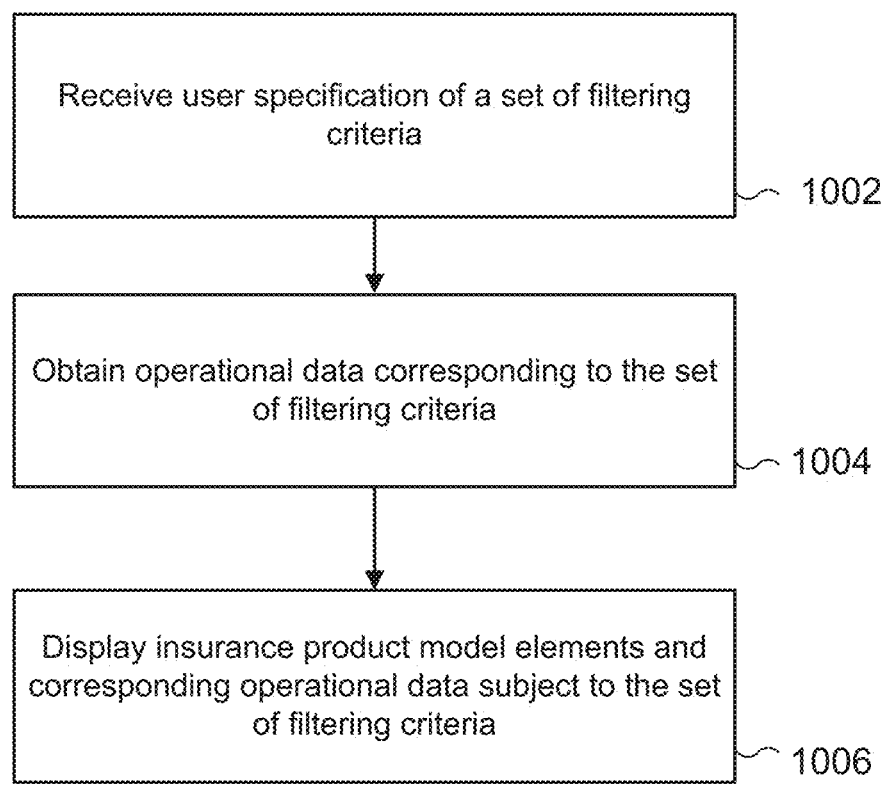
FIG. 10 is a flowchart illustrating an embodiment of a process for presenting an insurance product model and filtered corresponding operational data.

FIG. 10 is a flowchart illustrating an embodiment of a process for presenting an insurance product model and filtered corresponding operational data. In some embodiments, this process is performed by product designer 202. In some embodiments, this process is performed after process 900.

At 1002, a user specification of a set of filtering criteria is received. For example, in FIG. 7B, a user has specified a filter of 1 year, All US, and tag QX.

At 1004, operational data corresponding to the set of filtering criteria is obtained. For example, operational data associated with this filtering criteria may be obtained from: policy system 204, analytics engine 208, and/or product designer 202, any of which may have obtained and/or derived operational data from portal 210, reporting tool 212, and/or other system(s) 214. In some embodiments, it is possible to obtain operational data directly from portal 210, reporting tool 212, and/or other system(s) 214.

At 1006, insurance product model elements and corresponding operational data is displayed subject to the set of filtering criteria. In some embodiments, the insurance product model options or elements that are not applicable or not available under a particular filtering option are not displayed. For example, in FIG. 7B, the number of bound policies only includes those polices within 1 year, in the US, and tagged QX. Because option $5000 is not available under marketing campaign QX, option $5000 is not shown.

In some embodiments, the Product Designer tool may encompass additional aspects of insurance product design, including management of rating elements (algorithms, tables, and rules defined to determine the price of an insurance policy). Similar statistical data and filters pertaining to operational data such as policies bound could be provided to the user to inform decisions and configuration changes made.

Presenting a set of insurance product model elements and operational data corresponding to the set of insurance product model elements has been described. Presenting operational data increases the capabilities and functionality of the product designer, particularly in terms of allowing the user to make decisions on how to edit the insurance product model based on the operational data at design time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
maintain an insurance product model that specifies possible configurations of insurance policy products associated with a plurality of insurance policies;

in response to a user input to a graphical user interface, access a link to operational data pertaining to a set of existing insurance transactional data associated with the insurance policies;

obtain, via the accessed link, the operational data pertaining to the set of existing insurance transactional data associated with the insurance policies; and based at least in part on at least some of the obtained operational data pertaining to the set of existing insurance transactional data associated with the insurance policies, augment, in the graphical user interface, a view of at least a portion of the insurance product model comprising a set of insurance product model elements; and a memory coupled to the processor and configured to provide the processor with instructions.

2. The system recited in claim 1, wherein the operational data comprises transactional data, tag information, or both.

3. The system recited in claim 2, wherein the transactional data comprises policies, quotes, claims, billing, premiums, profit, fraud, user behavior related data, or a combination thereof.

4. The system recited in claim 2, wherein the tag information comprises campaign identification information, inbound channel data, or both.

5. The system recited in claim 2, wherein the tag information is added upstream from a product designer module.

6. The system recited in claim 1, wherein the set of insurance product model elements corresponds to a set of insurance product options.

7. The system recited in claim 1, wherein the operational data is obtained from an analytics engine that is to aggregate operational data from a web portal or reporting tool.

8. The system recited in claim 1, wherein the operational data is obtained from a policy system that is to manage the plurality of insurance policies and aggregate operational data from a web portal or reporting tool.

9. The system recited in claim 1, wherein the at least a portion of the insurance product model and the at least some of the operational data are presented adjacent to each other in a display.

10. The system recited in claim 1, wherein the processor is further configured to receive a user specification of a set of filtering criteria.

11. The system recited in claim 10, wherein the operational data obtained corresponds to the set of filtering criteria.

12. The system recited in claim 10, wherein the insurance product model elements are subject to the set of filtering criteria.

13. The system recited in claim 11, wherein the filtering criteria include tags, time, region, or campaign.

14. The system recited in claim 11, wherein the filtering criteria correspond to one or more availability indicators.

15. The system recited in claim 11, wherein the filtering criteria are automatically generated.

16. The system recited in claim 11, wherein the filtering criteria include a tag associated with a campaign and only options offered under the campaign are presented in the graphical user interface.

17. The system recited in claim 1, wherein each insurance policy is associated with a campaign tag at a time the insurance policy becomes bound.

18. The system recited in claim 11, wherein the filtering criteria include a time period and an option to filter only display options available during the time period.

19. The system recited in claim 1, wherein marketing or offerings are adjusted based at least in part on the operational data.

20. The system recited in claim 1, wherein tags are presented for a user to select.

21. The system recited in claim 1, wherein the processor is further configured to receive an edit to the insurance product model based at least in part on the operational data.

22. The system recited in claim 1, wherein the processor is further configured to obtain a link to further information regarding the at least some of the operational data.

23. The system recited in claim 1, wherein the processor is further configured to present to be displayed one or more tag indicators for each insurance product model element, indicating which insurance product model element is or was available under a campaign associated with each tag indicator.

24. A method, comprising:

maintaining an insurance product model that specifies possible configurations of insurance policy products associated with a plurality of insurance policies;

in response to a user input to a graphical user interface, accessing, using one or more processors, a link to operational data pertaining to a set of existing insurance transactional data associated with the insurance policies;

obtaining, via the accessed link, the operational data pertaining to the set of existing insurance transactional data associated with the insurance policies; and based at least in part on at least some of the obtained operational data pertaining to the set of existing insurance transactional data associated with the insurance policies, augmenting, in the graphical user interface, a view of at least a portion of the insurance product model comprising a set of insurance product model elements.

25. A computer program product for presenting operational data, the computer program product being embodied in a tangible, non-transitory computer readable storage medium and comprising computer instructions for:

maintaining an insurance product model that specifies possible configurations of insurance policy products associated with a plurality of insurance policies;

in response to a user input to a graphical user interface, accessing, using one or more processors, a link to operational data pertaining to a set of existing insurance transactional data associated with the insurance policies;

obtaining, via the accessed link, the operational data pertaining to the set of existing insurance transactional data associated with the insurance policies; and based at least in part on at least some of the obtained operational data pertaining to the set of existing insurance transactional data associated with the insurance policies, augmenting, in the graphical user interface, a view of at least a portion of the insurance product model comprising a set of insurance product model elements.

* * * * *